(12) United States Patent
Swedek et al.

(10) Patent No.: US 7,682,221 B2
(45) Date of Patent: Mar. 23, 2010

(54) INTEGRATED ENDPOINT DETECTION SYSTEM WITH OPTICAL AND EDDY CURRENT MONITORING

(75) Inventors: Boguslaw A. Swedek, Cupertino, CA (US); Manoocher Birang, Los Gatos, CA (US); Nils Johansson, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 11/677,450

(22) Filed: Feb. 21, 2007

(65) Prior Publication Data

US 2007/0135958 A1 Jun. 14, 2007

Related U.S. Application Data

(62) Division of application No. 11/217,598, filed on Aug. 31, 2005, now Pat. No. 7,195,536, which is a division of application No. 09/847,867, filed on May 2, 2001, now Pat. No. 6,966,816.

(51) Int. Cl.
| | | |
|---|---|---|
| B24B 49/00 | (2006.01) | |
| B24B 29/00 | (2006.01) | |
| G01R 33/12 | (2006.01) | |
| G01B 7/06 | (2006.01) | |
| G06F 19/00 | (2006.01) | |
| B24B 37/04 | (2006.01) | |
| G01L 21/00 | (2006.01) | |

(52) U.S. Cl. ............................... 451/5; 451/6; 451/288; 324/230

(58) Field of Classification Search .................. 451/5, 451/6–11, 41, 207, 288; 324/230, 232, 237
See application file for complete search history.

(56) References Cited

U.S. PATENT DOCUMENTS

| | | | |
|---|---|---|---|
| 4,005,359 A | 1/1977 | Smoot | |
| 4,112,365 A | 9/1978 | Larson et al. | |
| 4,303,885 A | 12/1981 | Davis et al. | |
| 4,467,281 A | 8/1984 | Davis et al. | |
| 4,556,845 A | 12/1985 | Strope et al. | |
| 4,673,877 A | 6/1987 | Sakamoto et al. | |
| 4,715,007 A | 12/1987 | Fujita et al. | |
| 4,716,366 A | 12/1987 | Hosoe et al. | |
| 4,829,251 A | 5/1989 | Fischer | |
| 4,849,694 A | 7/1989 | Coates | |
| 4,963,500 A | 10/1990 | Cogan | |
| 4,977,853 A | 12/1990 | Falcoff et al. | |
| 5,001,356 A | 3/1991 | Ichikawa | |
| 5,003,262 A | 3/1991 | Egner et al. | |

(Continued)

FOREIGN PATENT DOCUMENTS

EP 0 460 348 A 12/1991

(Continued)

*Primary Examiner*—Alvin J. Grant
(74) *Attorney, Agent, or Firm*—Fish & Richardson PC

(57) ABSTRACT

A chemical mechanical polishing apparatus and method can use an eddy current monitoring system and an optical monitoring system. Signals from the monitoring systems can be combined on an output line and extracted by a computer. A thickness of a polishing pad can be calculated. The eddy current monitoring system and optical monitoring system can measure substantially the same location on the substrate.

6 Claims, 11 Drawing Sheets

U.S. PATENT DOCUMENTS

| | | | |
|---|---|---|---|
| 5,081,796 | A | 1/1992 | Schultz |
| 5,140,265 | A | 8/1992 | Sakiyama et al. |
| 5,213,655 | A | 5/1993 | Leach et al. |
| 5,237,271 | A | 8/1993 | Hedengren |
| 5,343,146 | A | 8/1994 | Koch et al. |
| 5,355,083 | A | 10/1994 | George et al. |
| 5,357,331 | A | 10/1994 | Flockencier |
| 5,413,941 | A | 5/1995 | Koos et al. |
| 5,427,878 | A | 6/1995 | Corliss |
| 5,433,651 | A | 7/1995 | Lustig et al. |
| 5,451,863 | A | 9/1995 | Freeman |
| 5,511,005 | A | 4/1996 | Abbe et al. |
| 5,525,903 | A | 6/1996 | Mandl et al. |
| 5,541,510 | A | 7/1996 | Danielson |
| 5,559,428 | A | 9/1996 | Li et al. |
| 5,605,760 | A | 2/1997 | Roberts |
| 5,609,511 | A | 3/1997 | Moriyama et al. |
| 5,640,242 | A | 6/1997 | O'Boyle et al. |
| 5,644,221 | A | 7/1997 | Li et al. |
| 5,658,183 | A | 8/1997 | Sandhu et al. |
| 5,660,672 | A | 8/1997 | Li et al. |
| 5,663,797 | A | 9/1997 | Sandhu |
| 5,672,091 | A | 9/1997 | Takahashi et al. |
| RE35,703 | E | 12/1997 | Koch et al. |
| 5,708,506 | A | 1/1998 | Birang |
| 5,719,495 | A | 2/1998 | Moslehi |
| 5,730,642 | A | 3/1998 | Sandhu et al. |
| 5,731,697 | A | 3/1998 | Li et al. |
| 5,733,171 | A | 3/1998 | Allen et al. |
| 5,762,537 | A | 6/1998 | Sandhu et al. |
| 5,791,969 | A | 8/1998 | Lund |
| 5,807,165 | A | 9/1998 | Uzoh et al. |
| 5,838,447 | A | 11/1998 | Hiyama et al. |
| 5,851,135 | A | 12/1998 | Sandhu et al. |
| 5,865,666 | A | 2/1999 | Nagahara |
| 5,872,633 | A | 2/1999 | Holzapfel et al. |
| 5,889,401 | A | 3/1999 | Jourdain et al. |
| 5,893,796 | A | 4/1999 | Birang et al. |
| 5,899,792 | A | 5/1999 | Yagi |
| 5,911,619 | A | 6/1999 | Uzoh et al. |
| 5,913,713 | A | 6/1999 | Cheek et al. |
| 5,929,994 | A | 7/1999 | Lee et al. |
| 5,948,203 | A | 9/1999 | Wang |
| 5,949,927 | A | 9/1999 | Tang |
| 5,964,643 | A | 10/1999 | Birang et al. |
| 6,004,187 | A | 12/1999 | Nyui et al. |
| 6,034,781 | A | 3/2000 | Sarfaty et al. |
| 6,068,539 | A | 5/2000 | Bajaj et al. |
| 6,071,178 | A | 6/2000 | Baker, III |
| 6,120,348 | A | 9/2000 | Fujita et al. |
| 6,159,073 | A | 12/2000 | Wiswesser et al. |
| 6,179,709 | B1 | 1/2001 | Redeker et al. |
| 6,190,234 | B1 | 2/2001 | Swedek et al. |
| 6,254,459 | B1 | 7/2001 | Bajaj et al. |
| 6,280,289 | B1 | 8/2001 | Wiswesser et al. |
| 6,296,548 | B1 | 10/2001 | Wiswesser et al. |
| 6,309,276 | B1 | 10/2001 | Tsai et al. |
| 6,407,546 | B1 | 6/2002 | Le et al. |
| 6,431,949 | B1 | 8/2002 | Ishikawa et al. |
| 6,433,541 | B1 | 8/2002 | Lehman et al. |
| 6,448,795 | B1 | 9/2002 | Ermakov et al. |
| 6,458,014 | B1 | 10/2002 | Ishikawa et al. |
| 6,558,229 | B2 | 5/2003 | Kimura et al. |
| 6,563,308 | B2 | 5/2003 | Nagano et al. |
| 6,575,825 | B2 | 6/2003 | Tolles et al. |
| 6,586,337 | B2 | 7/2003 | Parikh |
| 6,621,264 | B1 | 9/2003 | Lehman et al. |
| 6,663,469 | B2 | 12/2003 | Kimura et al. |
| 6,707,540 | B1 * | 3/2004 | Lehman et al. ............... 356/72 |
| 6,741,076 | B2 * | 5/2004 | Le ............... 324/230 |
| 6,762,604 | B2 * | 7/2004 | Le ............... 324/230 |
| 6,923,711 | B2 * | 8/2005 | Laursen et al. ............... 451/6 |
| 6,966,816 | B2 * | 11/2005 | Swedek et al. ............... 451/5 |
| 2001/0008827 | A1 | 7/2001 | Kimura et al. |
| 2002/0002029 | A1 | 1/2002 | Kimura et al. |
| 2002/0013124 | A1 | 1/2002 | Tsujimura et al. |
| 2002/0077031 | A1 | 6/2002 | Johansson et al. |
| 2002/0098777 | A1 | 7/2002 | Laursen et al. |
| 2002/0164925 | A1 * | 11/2002 | Swedek et al. ............... 451/5 |
| 2007/0103150 | A1 * | 5/2007 | Tada et al. ............... 324/229 |

FOREIGN PATENT DOCUMENTS

| | | |
|---|---|---|
| EP | 0 663 265 A1 | 7/1995 |
| EP | 0 640 438 A1 | 9/1995 |
| EP | 0 738 561 A1 | 10/1996 |
| EP | 0 881 040 A2 | 12/1998 |
| EP | 0 881 484 A2 | 12/1998 |
| EP | 0 402 527 A2 | 12/2000 |
| EP | 1 116 552 A2 | 7/2001 |
| JP | 1-136009 | 5/1989 |
| JP | 3-234467 | 10/1991 |
| JP | 3-295409 | 12/1991 |
| JP | 7-091948 | 4/1995 |
| WO | 01/46684 | 6/2001 |
| WO | 01/89765 | 11/2001 |

* cited by examiner

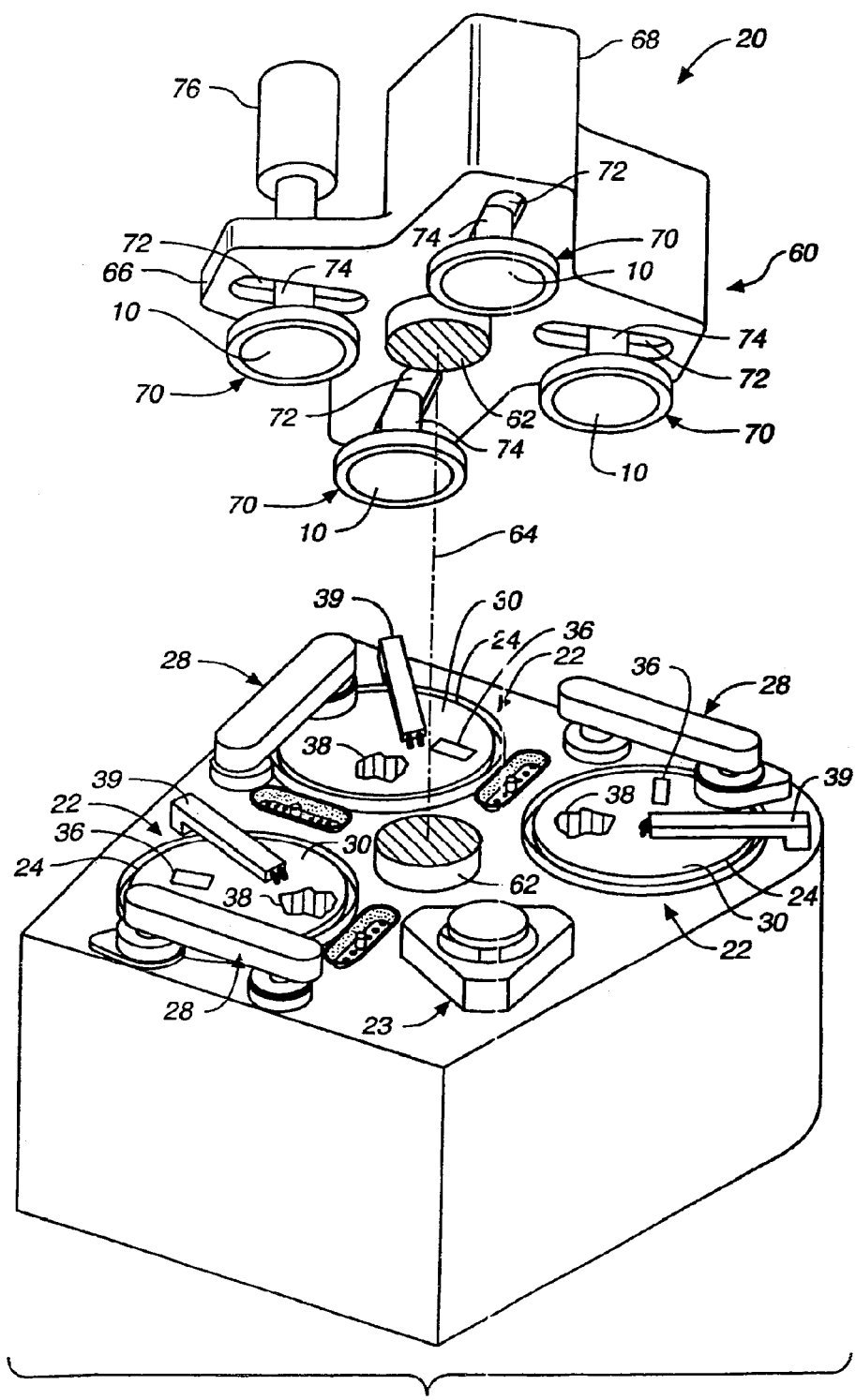
FIG._1

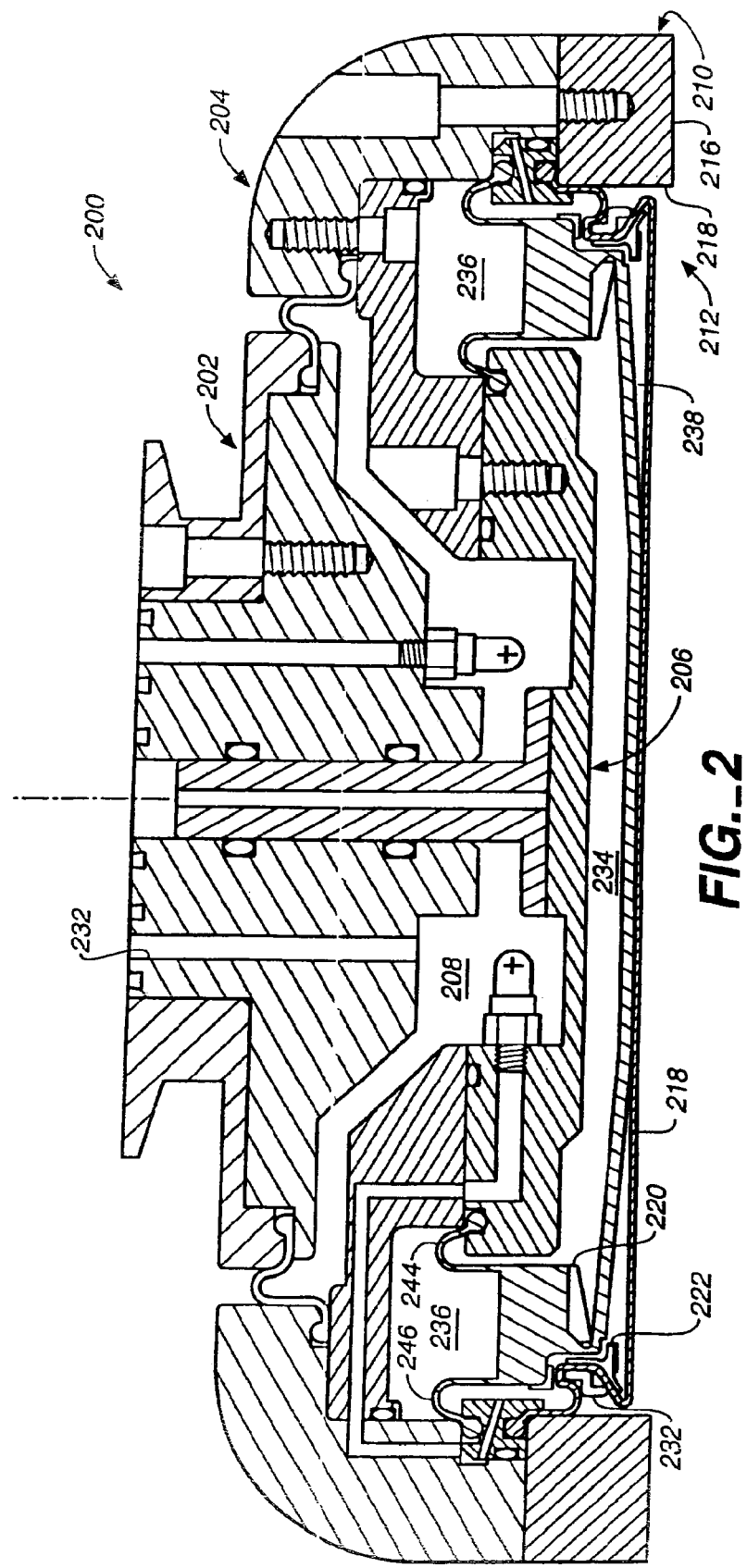
FIG._2

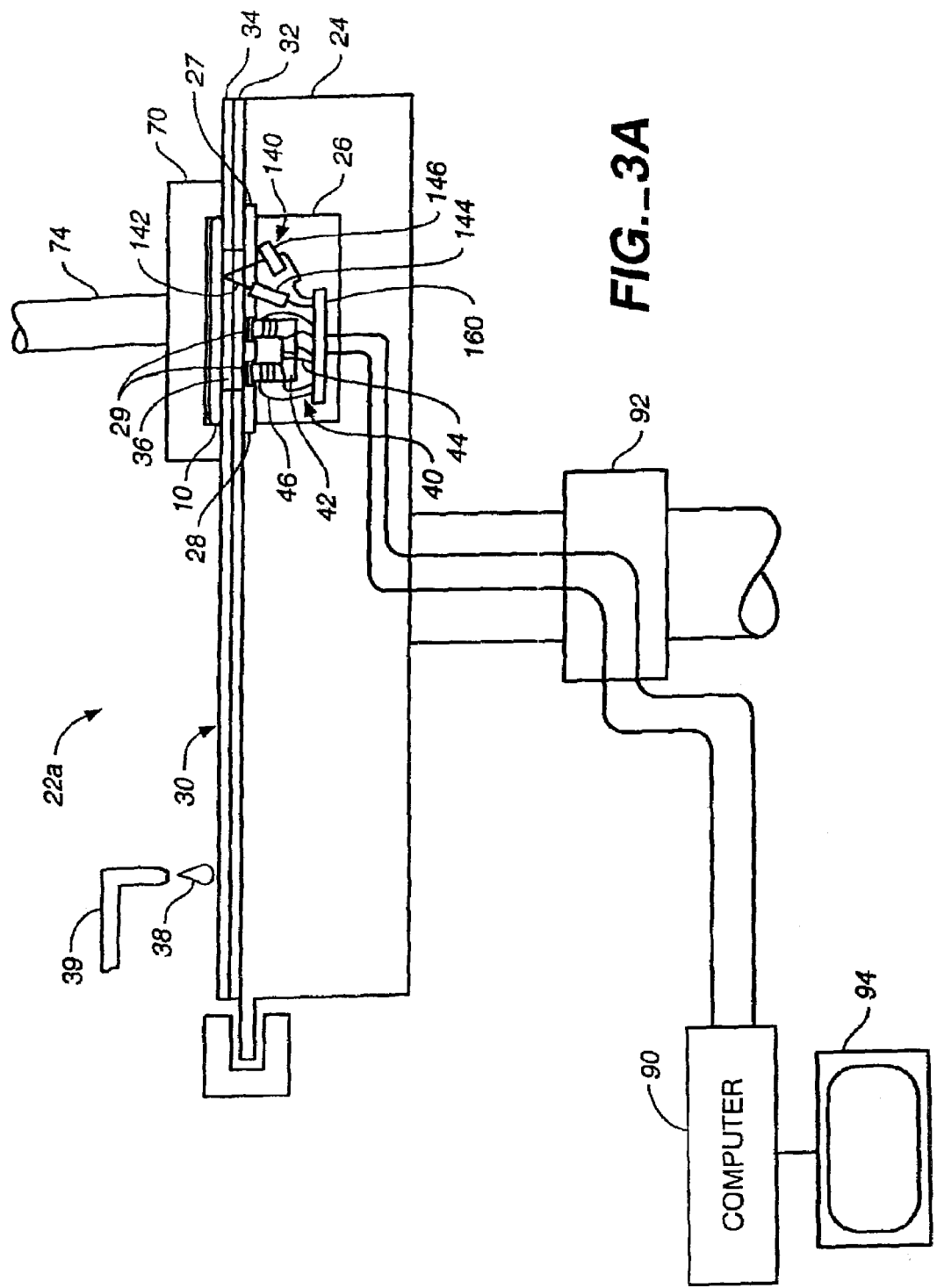

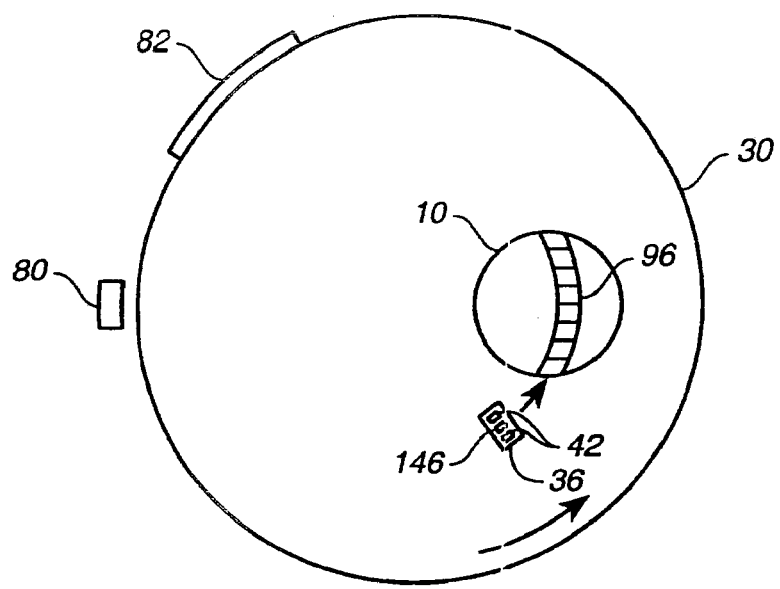
FIG._3B
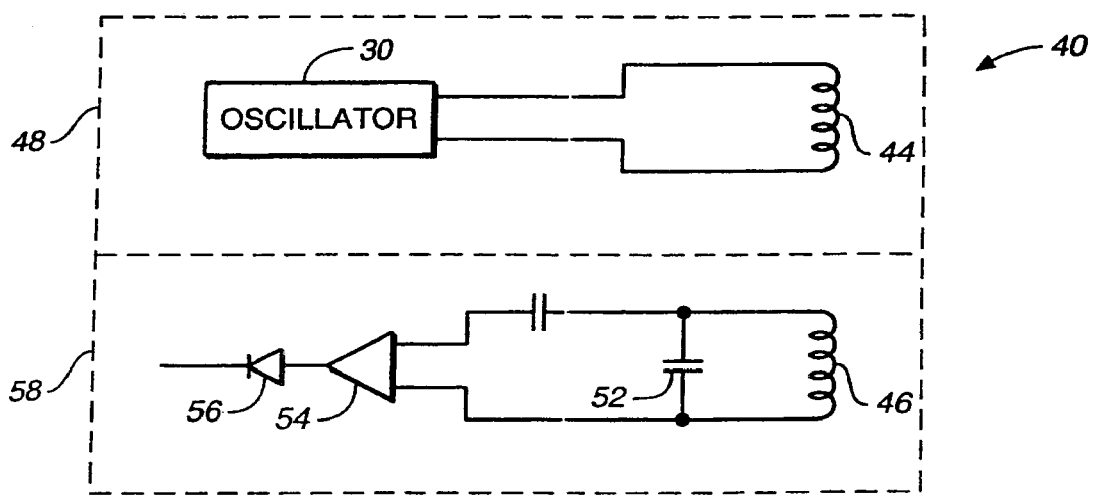
FIG._4

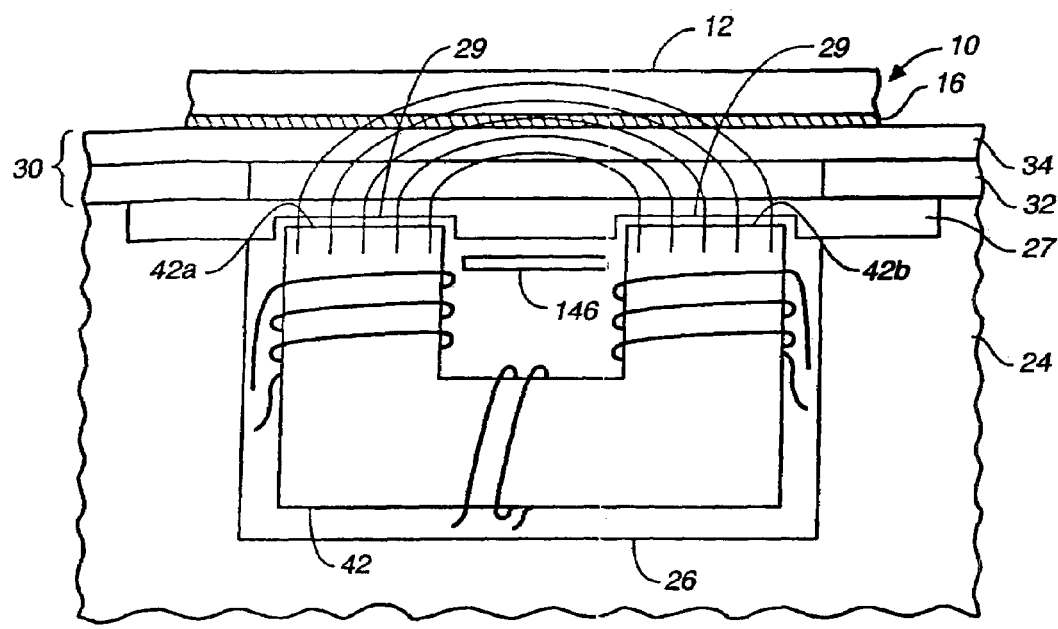
FIG._5

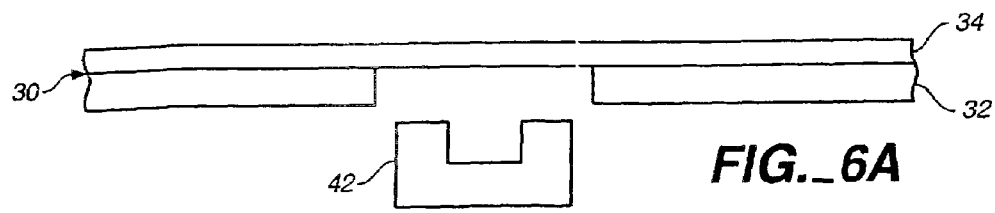
FIG._6A
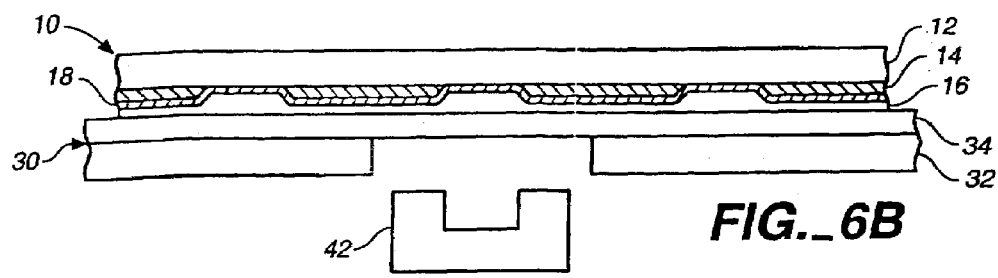
FIG._6B
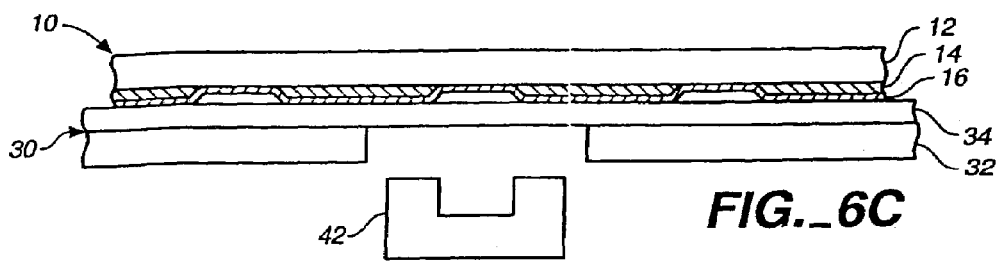
FIG._6C
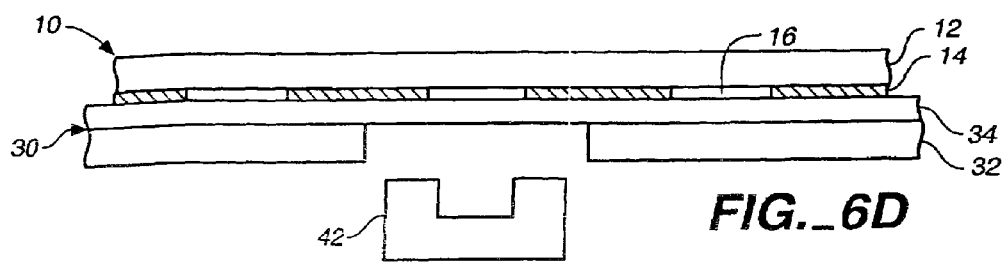
FIG._6D

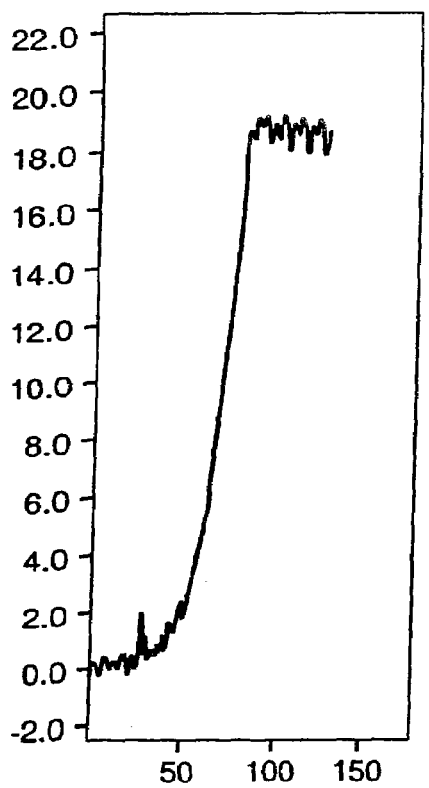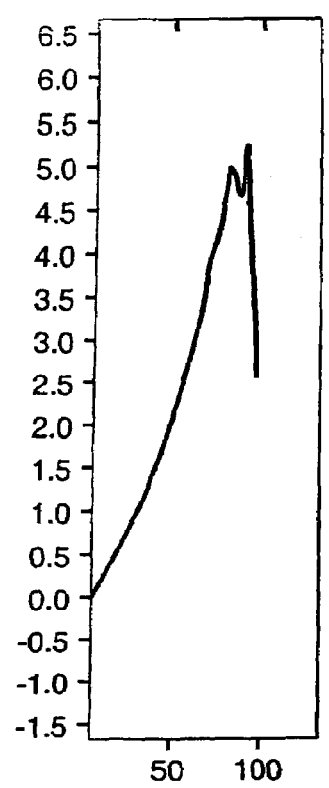
FIG._7     FIG._9

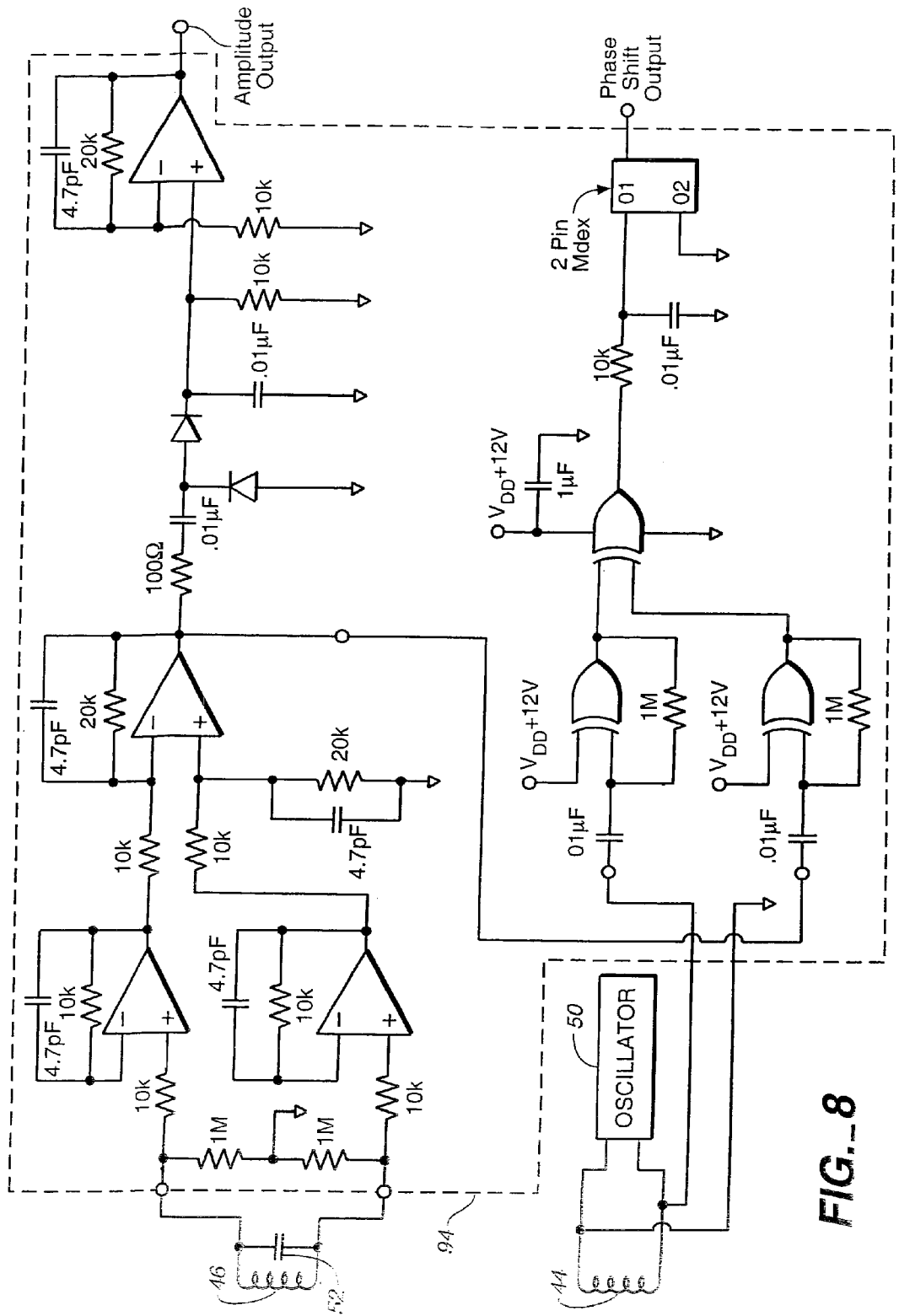
FIG._8

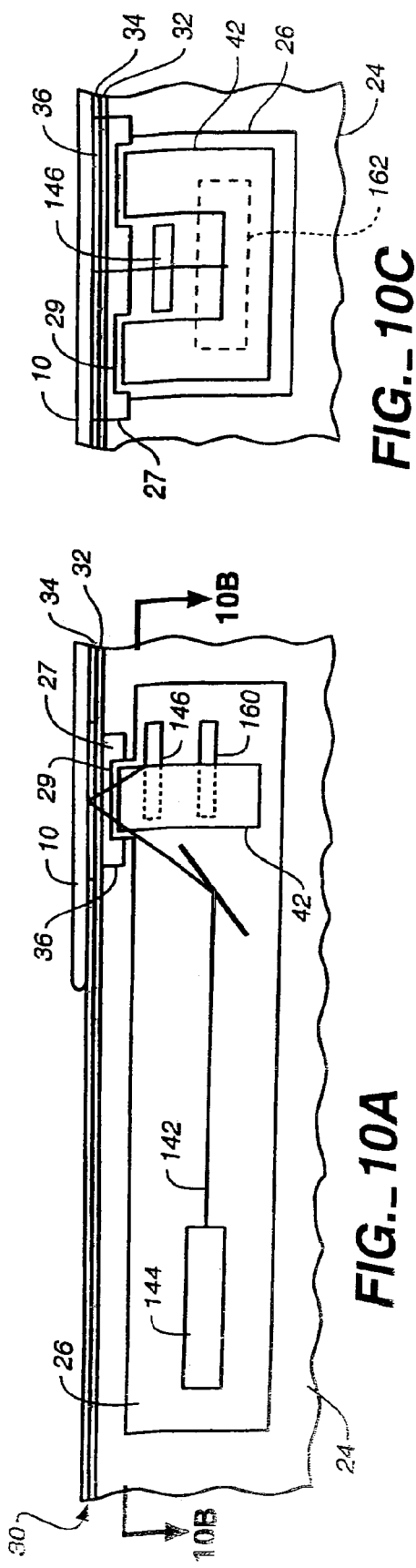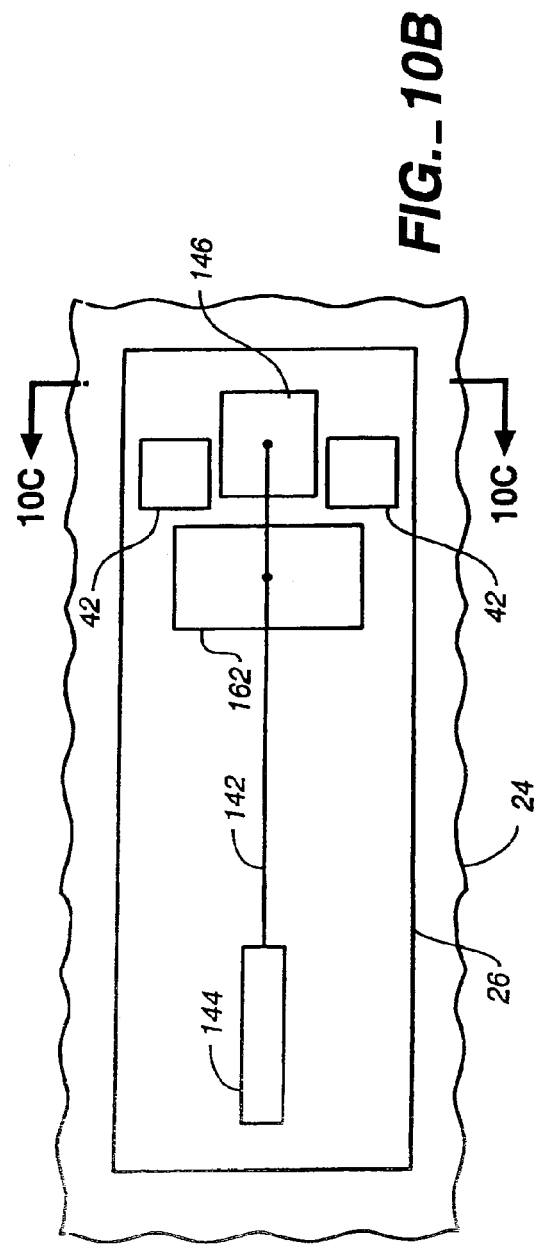

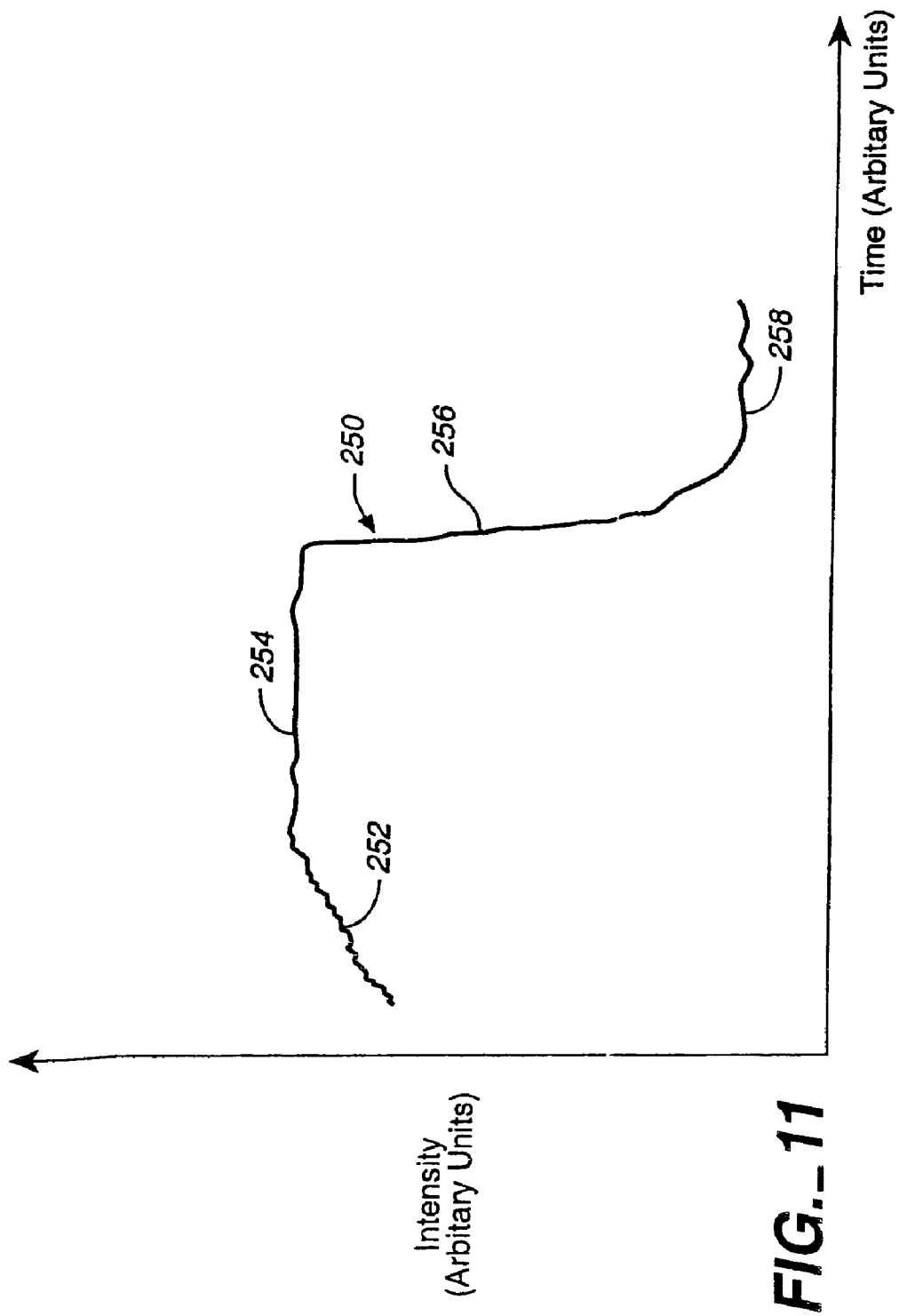
FIG._11

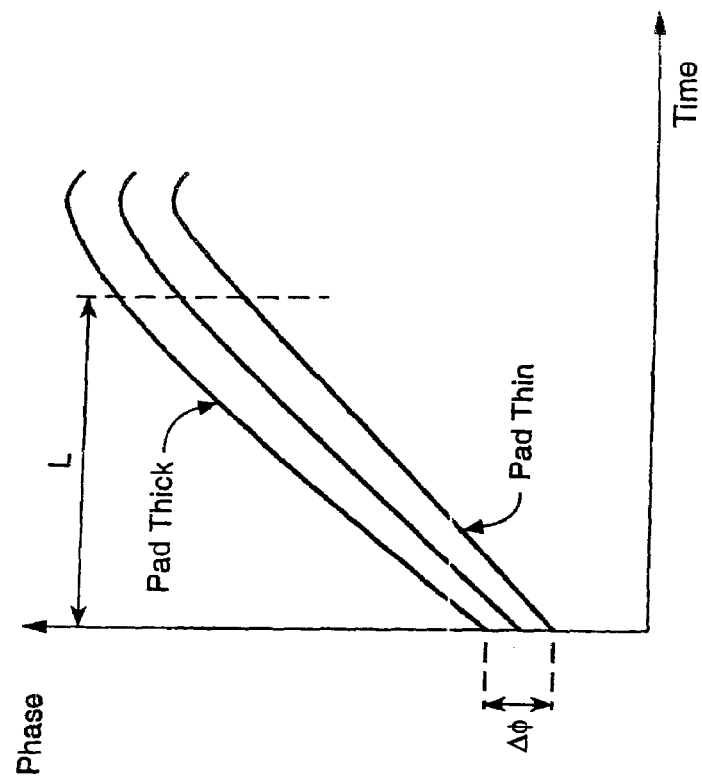
FIG._12B
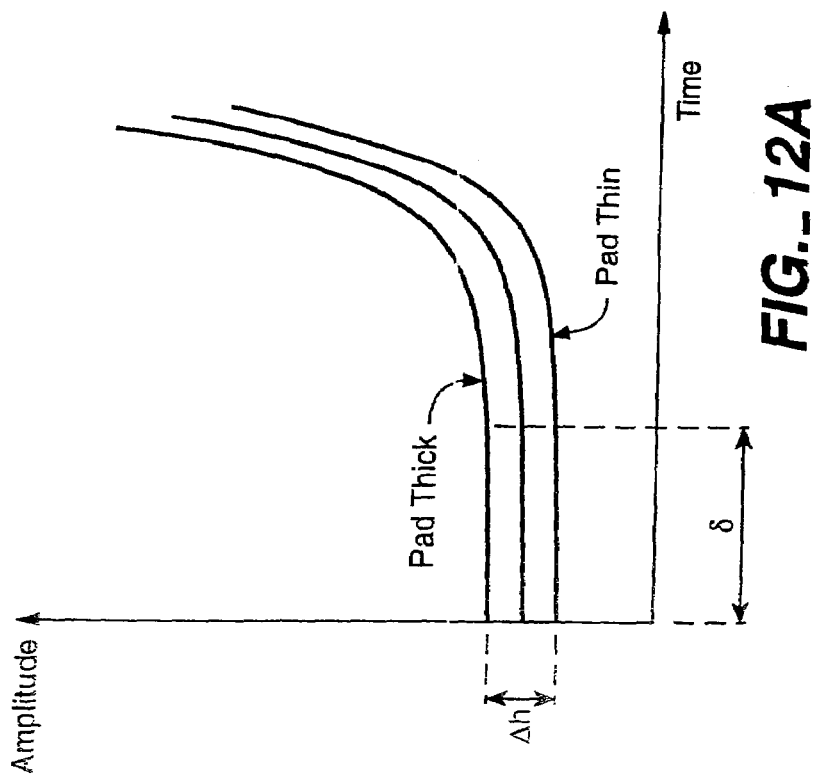
FIG._12A

INTEGRATED ENDPOINT DETECTION SYSTEM WITH OPTICAL AND EDDY CURRENT MONITORING

CROSS-REFERENCE TO RELATED APPLICATIONS

This application is a divisional application and claims the benefit of priority under 35 U.S.C. Section 120 of U.S. application Ser. No. 11/217,598, filed on Aug. 31, 2005, which is a divisional of U.S. application Ser. No. 09/847,867, filed on May 2, 2001. The disclosure of each prior application is considered part of and is herein incorporated by reference in its entirety in the disclosure of this application.

BACKGROUND

The present invention relates generally to chemical mechanical polishing of substrates, and more particularly to methods and apparatus for monitoring a metal layer during chemical mechanical polishing.

An integrated circuit is typically formed on a substrate by the sequential deposition of conductive, semiconductive or insulative layers on a silicon wafer. One fabrication step involves depositing a filler layer over a non-planar surface, and planarizing the filler layer until the non-planar surface is exposed. For example, a conductive filler layer can be deposited on a patterned insulative layer to fill the trenches or holes in the insulative layer. The filler layer is then polished until the raised pattern of the insulative layer is exposed. After planarization, the portions of the conductive layer remaining between the raised pattern of the insulative layer form vias, plugs and lines that provide conductive paths between thin film circuits on the substrate. In addition, planarization is needed to planarize the substrate surface for photolithography.

Chemical mechanical polishing (CMP) is one accepted method of planarization. This planarization method typically requires that the substrate be mounted on a carrier or polishing head. The exposed surface of the substrate is placed against a rotating polishing disk pad or belt pad. The polishing pad can be either a "standard" pad or a fixed-abrasive pad. A standard pad has a durable roughened surface, whereas a fixed-abrasive pad has abrasive particles held in a containment media. The carrier head provides a controllable load on the substrate to push it against the polishing pad. A polishing slurry, including at least one chemically-reactive agent, and abrasive particles if a standard pad is used, is supplied to the surface of the polishing pad.

One problem in CMP is determining whether the polishing process is complete, i.e., whether a substrate layer has been planarized to a desired flatness or thickness, or when a desired amount of material has been removed. Overpolishing (removing too much) of a conductive layer or film leads to increased circuit resistance. On the other hand, under-polishing (removing too little) of a conductive layer leads to electrical shorting. Variations in the initial thickness of the substrate layer, the slurry composition, the polishing pad condition, the relative speed between the polishing pad and the substrate, and the load on the substrate can cause variations in the material removal rate. These variations cause variations in the time needed to reach the polishing endpoint. Therefore, the polishing endpoint cannot be determined merely as a function of polishing time.

One way to determine the polishing endpoint is to remove the substrate from the polishing surface and examine it. For example, the substrate can be transferred to a metrology station where the thickness of a substrate layer is measured, e.g., with a profilometer or a resistivity measurement. If the desired specifications are not met, the substrate is reloaded into the CMP apparatus for further processing. This is a time-consuming procedure that reduces the throughput of the CMP apparatus. Alternatively, the examination might reveal that an excessive amount of material has been removed, rendering the substrate unusable.

More recently, in-situ monitoring of the substrate has been performed, e.g., with optical or capacitance sensors, in order to detect the polishing endpoint. Other proposed endpoint detection techniques have involved measurements of friction, motor current, slurry chemistry, acoustics and conductivity. One detection technique that has been considered is to induce an eddy current in the metal layer and measure the change in the eddy current as the metal layer is removed.

SUMMARY

In one aspect, the invention is directed to an apparatus for chemical mechanical polishing. The apparatus has a platen to support a polishing surface, an eddy current monitoring system positioned in the platen to generate a first signal, an optical monitoring system positioned in the platen to generate a second signal, circuitry in the platen to combine the first and second signals into a third signal on an output line, and a computer to receive the third signal on the output line and extract the first and second signals.

Implementations of the invention may include one or more of the following features. The platen may be rotatable, and the output line may pass through a rotary electrical union between the circuitry and the computer. A carrier head may hold a substrate in contact with the polishing surface. The circuitry may assemble data from the first and second signals into packets, and the computer may extract the data from the packets.

In another aspect, the invention is directed to a method of determining the thickness of a polishing pad. In the method, a substrate having a conductive layer disposed thereon is positioned in contact with a polishing surface of a polishing pad. An alternating magnetic field is generated from an inductor to induce eddy currents in the conductive layer. A strength of the magnetic field is measured, and a thickness of the polishing pad is calculated from at least the strength of the magnetic field.

Implementations of the invention may include one or more of the following features. Generating the alternating magnetic field may include driving the inductor with a drive signal. A phase difference between the magnetic field and the drive signal may be measured. The thickness of the polishing pad may be calculated from at least the strength of the magnetic field and the phase difference. A test substrate may be polished with a first polishing pad having a first known thickness and with a second polishing pad having a second known thickness, and at least one coefficient may be generated to relate the thickness of the polishing pad to the strength of the signal during polishing. A user may be alerted if the thickness of the polishing pad falls below a predetermined thickness.

In another aspect, the invention is directed to a method of measuring a thickness of a conductive layer on a substrate during chemical mechanical polishing. In the method, a substrate having a conductive layer disposed thereon is positioned in contact with a polishing surface of a polishing pad. Relative motion is created between the substrate and the polishing pad to polish the substrate. An inductor is driven with a drive signal to generate an alternating magnetic field that induces eddy currents in the conductive layer, a strength of the magnetic field and a phase difference between the magnetic field and the drive signal are measured, a correction factor is calculated based on the strength of the magnetic field, and a thickness of the conductive layer is calculated from the phase difference and the correction factor.

Implementations of the invention may include one or more of the following features. A thickness of the polishing pad may be calculated from at least the strength of the magnetic field. A test substrate may be polished with a first polishing pad having a first known thickness and with a second polishing pad having a second known thickness, or a test substrate may be polished with a first polishing pad when the first polishing pad has a first known thickness and polished with the first polishing pad when the first polishing pad has a second known thickness. At least one coefficient may be generated to relate the thickness of the polishing pad to the strength of the signal during polishing. A user may be alerted if the thickness of the polishing pad falls below a predetermined thickness.

In another aspect, the invention is directed to a chemical mechanical polishing apparatus. The apparatus has a polishing surface, a carrier head to hold a substrate having a conductive layer disposed thereon in contact with the polishing surface, a motor to create relative motion between the substrate and the polishing surface, an eddy current monitoring system including an inductor and a current source to drive the inductor to generate an alternating magnetic field that induces eddy currents in the conductive layer, a sensor to measure a strength of the magnetic field and a phase difference between the magnetic field and the drive signal, and a computer configured to calculate a correction factor based on the strength of the magnetic field and calculate a thickness of the conductive layer from the phase difference and the correction factor.

In another aspect, the invention is directed to an apparatus for chemical mechanical polishing. The apparatus has a platen to support a polishing surface, a carrier head to hold a substrate, an eddy current monitoring system to generate a first signal during polishing, and an optical monitoring system positioned to generate a second signal during polishing. The eddy current monitoring system includes an inductor to generate a magnetic field that extends to a first region of the substrate, and the optical monitoring system includes a light source positioned and oriented to direct a light beam to a spot in the first region of the substrate. Thus, the eddy current monitoring system and optical monitoring system measure substantially the same location on the substrate.

Implementations of the invention may include one or more of the following features. The eddy current monitoring system may include a core having a plurality of prongs. The optical monitoring system may includes a detector positioned at least partially between the prongs. The light beam may impinge the substrate at a point substantially equidistant from the prongs. The light beam may impinge the substrate at a spot directly above the core.

Possible advantages of implementations of the invention can include one or more of the following. The optical and eddy current monitoring systems can monitor essentially the same spot on the substrate. The thickness of the conductive layer can be measured during bulk polishing. The thickness of a polishing pad used to polish the substrate can also be measured during polishing. The pressure profile applied by the carrier head can be adjusted to compensate for non-uniform polishing rates and non-uniform thickness of the incoming substrate. Polishing can be stopped with high accuracy. Over-polishing and under-polishing can be reduced, as can dishing and erosion, thereby improving yield and throughput.

Other features and advantages of the invention will become apparent from the following description, including the drawings and claims.

BRIEF DESCRIPTION OF THE DRAWINGS

FIG. 1 is a schematic exploded perspective view of a chemical mechanical polishing apparatus.

FIG. 2 is a schematic cross-sectional view of a carrier head.

FIG. 3A is a schematic side view, partially cross-sectional, of a chemical mechanical polishing station that includes an eddy current monitoring system and an optical monitoring system.

FIG. 3B is a schematic top view of a platen from the polishing station of FIG. 3A. FIG. 4 is a schematic circuit diagram of the eddy current monitoring system.

FIG. 5 is a schematic cross-sectional view illustrating a magnetic field generated by the eddy current monitoring system.

FIGS. 6A-6D schematically illustrate a method of detecting a polishing endpoint using an eddy current sensor.

FIG. 7 is a graph illustrating an amplitude trace from the eddy current monitoring system.

FIG. 8 is a schematic circuit diagram of an eddy current monitoring system that senses an amplitude and a phase shift.

FIG. 9 is a graph illustrating a phase shift trace from the eddy current monitoring system.

FIGS. 10A-10C are cross-sectional views of a platen with an optical and eddy current monitoring system.

FIG. 11 is a graph illustrating an amplitude trace from the optical monitoring system.

FIGS. 12A and 12B are graphs illustrating amplitude traces and phase difference traces, respectively, generated by the eddy current monitoring system at different pad thicknesses.

DETAILED DESCRIPTION

Referring to FIG. 1, one or more substrates 10 can be polished by a CMP apparatus 20. A description of a similar polishing apparatus 20 can be found in U.S. Pat. No. 5,738,574, the entire disclosure of which is incorporated herein by reference. Polishing apparatus 20 includes a series of polishing stations 22a, 22b and 22c, and a transfer station 23.

Each polishing station includes a rotatable platen 24 on which is placed a polishing pad 30. The first and second stations 22a and 22b can include a two-layer polishing pad with a hard durable outer surface or a fixed-abrasive pad with embedded abrasive particles. The final polishing station 22c can include a relatively soft pad or a two-layer pad. Each polishing station can also include a pad conditioner apparatus 28 to maintain the condition of the polishing pad so that it will effectively polish substrates.

Referring to FIG. 3A, a two-layer polishing pad 30 typically has a backing layer 32 which abuts the surface of platen 24 and a covering layer 34 which is used to polish substrate 10. Covering layer 34 is typically harder than backing layer 32. However, some pads have only a covering layer and no backing layer. Covering layer 34 can be composed of foamed or cast polyurethane, possibly with fillers, e.g., hollow microspheres, and/or a grooved surface. Backing layer 32 can be composed of compressed felt fibers leached with urethane. A two-layer polishing pad, with the covering layer composed of IC-1000 and the backing layer composed of SUBA-4, is available from Rodel, Inc., of Newark, Del. (IC-1000 and SUBA-are product names of Rodel, Inc.).

During a polishing step, a slurry 38 containing a liquid (e.g., deionized water for oxide polishing) and a pH adjuster (e.g., potassium hydroxide for oxide polishing) can be supplied to the surface of polishing pad 30 by a slurry supply port or combined slurry/rinse arm 39. If polishing pad 30 is a standard pad, slurry 38 can also include abrasive particles (e.g., silicon dioxide for oxide polishing).

Returning to FIG. 1, a rotatable multi-head carousel 60 supports four carrier heads 70. The carousel is rotated by a central post 62 about a carousel axis 64 by a carousel motor assembly (not shown) to orbit the carrier head systems and the substrates attached thereto between polishing stations 22 and transfer station 23. Three of the carrier head systems receive and hold substrates, and polish them by pressing them against the polishing pads. Meanwhile, one of the carrier head systems receives a substrate from and delivers a substrate to a loading apparatus via transfer station 23.

Each carrier head 70 is connected by a carrier drive shaft 74 to a carrier head rotation motor 76 (shown by the removal of one quarter of cover 68) so that each carrier head can independently rotate about it own axis. In addition, each carrier head 70 independently laterally oscillates in a radial slot 72 formed in carousel support plate 66. A description of a suitable carrier head 70 can be found in U.S. patent application Ser. Nos. 09/470,820 and 09/535,575, filed Dec. 23, 1999 and Mar. 27, 2000, the entire disclosures of which are incorporated by reference. In operation, the platen is rotated about its central axis 25, and the carrier head is rotated about its central axis 71 and translated laterally across the surface of the polishing pad.

As disclosed in the foregoing patent applications and as shown in FIG. 2, an exemplary carrier head 70 includes a housing 202, a base assembly 204, a gimbal mechanism 206 (which can be considered part of the base assembly 204), a loading chamber 208, a retaining ring 210, and a substrate backing assembly 212 which includes three pressurizable chambers, such as a floating upper chamber 236, a floating lower chamber 234, and an outer chamber 238. Loading chamber 208 is located between housing 202 and base assembly 204 to apply a load to and to control the vertical position of base assembly 204. A first pressure regulator (not shown) can be fluidly connected to loading chamber 208 by a passage 232 to control the pressure in the loading chamber and the vertical position of base assembly 204.

The substrate backing assembly 212 includes a flexible internal membrane 216, a flexible external membrane 218, an internal support structure 220, an external support structure 230, an internal spacer ring 222 and an external spacer ring 232. Flexible internal membrane 216 includes a central portion which applies pressure to substrate 10 in a controllable area. The volume between base assembly 204 and internal membrane 216 that is sealed by an inner flap 244 provides pressurizable floating lower chamber 234. The annular volume between base assembly 204 and internal membrane 216 that is sealed by inner flap 244 and outer flap 246 defines pressurizable floating upper chamber 236. The sealed volume between internal membrane 216 and external membrane 218 defines a pressurizable outer chamber 238. Three pressure regulators (not shown) can be independently connected to floating lower chamber 234, floating upper chamber 236 and outer chamber 238. Thus, a fluid such as a gas can be directed into or out of each chamber independently.

The combination of pressures in floating upper chamber 236, floating lower chamber 234 and outer chamber 238 control both the contact area and the pressure of internal membrane 216 against a top surface of the external membrane 218. For example, by pumping fluid out of floating upper chamber 236, the edge of internal membrane 216 is lifted away from external membrane 218, thereby decreasing the contact diameter DC of the contact area between the internal membrane and external membrane. Conversely, by pumping fluid into floating upper chamber 236, the edge of internal membrane 216 is lowered toward external membrane 218, thereby increasing the contact diameter DC of the contact area. In addition, by pumping fluid into or out of floating lower chamber 234, the pressure of internal membrane 216 against external membrane 218 can be varied. Thus, the pressure in and the diameter of the area loaded by the carrier head can be controlled.

Referring to FIGS. 3A and 3B, a recess 26 is formed in platen 24, and a transparent cover 27, e.g., of glass or a hard plastic, can be placed over recess 26. In addition, a transparent section 36 is formed in polishing pad 30 overlying transparent cover 27. Transparent cover 27 and transparent section 36 are positioned such that they pass beneath substrate 10 during a portion of the platen's rotation, regardless of the translational position of the carrier head. Assuming that polishing pad 32 is a two-layer pad, transparent section 36 can be constructed by cutting an aperture in backing layer 32, and by replacing a section of cover layer 34 with a transparent plug. The plug can be a relatively pure polymer or polyurethane, e.g., formed without fillers. In general, the material of transparent section 36 should be non-magnetic and non-conductive.

Referring to FIG. 3A, the first polishing station 22a includes an in-situ eddy current monitoring system 40 and an optical monitoring system 140. The eddy current monitoring system 40 and optical monitoring system 140 can function as a polishing process control and endpoint detection system. The second polishing station 22b and the final polishing station 22c can both include just an optical monitoring system, although either may additionally include an eddy current monitoring system or only an eddy current monitoring system.

As shown by FIG. 3B, core 42 and window section 36 sweeps beneath the substrate 10 with each rotation of the platen. Each time the window section sweeps beneath the substrate, data can be collected from eddy current monitoring system 40 and optical monitoring system 140.

Referring to FIG. 4, eddy current monitoring system 40 includes a drive system 48 to induce eddy currents in a metal layer on the substrate and a sensing system 58 to detect eddy currents induced in the metal layer by the drive system. The monitoring system 40 includes a core 42 positioned in recess 26 to rotate with the platen, a drive coil 44 wound around one part of core 42, and a sense coil 46 wound around second part of core 42. For drive system 48, monitoring system 40 includes an oscillator 50 connected to drive coil 44. For sense system 58, monitoring system 40 includes a capacitor 52 connected in parallel with sense coil 46, an RF amplifier 54 connected to sense coil 46, and a diode 56. The oscillator 50, capacitor 52, RF amplifier 54, and diode 56 can be located on a printed circuit board 160 inside the recess 26. A computer 90 can be coupled to the components in the platen, including printed circuit board 160, through a rotary electrical union 92.

Referring to FIG. 5, core 42 can be a U-shaped body formed of a non-conductive material with a relatively high magnetic permeability. The driving coil can be designed to match the driving signal from the oscillator. The exact winding configuration, core composition and shape, and capacitor size can be determined experimentally. As shown, the lower surface of transparent cover 27 may include two rectangular indentations 29, and the two prongs 42a and 42b of core 42 may extend into the indentations so as to be positioned closer to the substrate.

Returning to FIG. 3A, in operation, oscillator 50 drives drive coil 44 to generate an oscillating magnetic field 48 that extends through the body of core 42 and into the gap 46 between the two poles 42a and 42b of the core. At least a portion of magnetic field 48 extends through thin portion 36 of polishing pad 30 and into substrate 10. If a metal layer 12 is present on substrate 10, oscillating magnetic field 48 generates eddy currents in the metal layer 12. The eddy currents cause the metal layer 12 to act as an impedance source in parallel with sense coil 46 and capacitor 52. As the thickness of the metal layer changes, the impedance changes, resulting in a change in the Q-factor of sensing mechanism. By detecting the change in the Q-factor of the sensing mechanism, the eddy current sensor can sense the change in the strength of the eddy currents, and thus the change in thickness of metal layer 12.

In general, the greater the expected initial thickness of the conductive film, the lower the desired resonant frequency. For example, for a relatively thin film, e.g., 2000 Angstroms, the capacitance and inductance can be selected to provide a relatively high resonant frequency, e.g., about 2 MHz. On the other hand, for a relatively thicker film, e.g., 20000 Angstroms, the capacitance and inductance can be selected to provide a relatively lower resonant frequency, e.g., about 50 kHz. However, high resonant frequencies may still work well with thick copper layers. In addition, very high frequencies (above 2 MHz) can be used to reduce background noise from metal parts in the carrier head.

Initially, referring to FIGS. 3A, 4 and 6A, before conducting polishing, oscillator 50 is tuned to the resonant frequency of the LC circuit, without any substrate present. This resonant frequency results in the maximum amplitude of the output signal from RF amplifier 54.

As shown in FIGS. 6B and 7, for a polishing operation, a substrate 10 is placed in contact with polishing pad 30. Substrate 10 can include a silicon wafer 12 and a conductive layer 16, e.g., a metal such as copper, disposed over one or more patterned underlying layers 14, which can be semiconductor, conductor or insulator layers. A barrier layer 18, such as tantalum or tantalum nitride, may separate the metal layer from the underlying dielectric.

The patterned underlying layers can include metal features, e.g., vias, pads and interconnects. Since, prior to polishing, the bulk of conductive layer 16 is initially relatively thick and continuous, it has a low resistivity, and relatively strong eddy currents can be generated in the conductive layer. As previously mentioned, the eddy currents cause the metal layer to function as an impedance source in parallel with sense coil 46 and capacitor 52. Consequently, the presence of conductive film 16 reduces the Q-factor of the sensor circuit, thereby significantly reducing the amplitude of the signal from RF amplifier 56.

Referring to FIGS. 6C and 7, as substrate 10 is polished, the bulk portion of conductive layer 16 is thinned. As conductive layer 16 thins, its sheet resistivity increases, and the eddy currents in the metal layer become dampened. Consequently, the coupling between metal layer 16 and sensor circuitry 58 is reduced (i.e., increasing the resistivity of the virtual impedance source). As the coupling declines, the Q-factor of the sensor circuit 58 increases toward its original value.

Referring to FIGS. 6D and 7, eventually the bulk portion of conductive layer 16 is removed, leaving conductive interconnects 16 in the trenches between the patterned insulative layer 14. At this points, the coupling between the conductive portions in the substrate, which are generally small and generally non-continuous, and sensor circuit 58 reaches a minimum. Consequently, the Q-factor of the sensor circuit reaches a maximum value (although not as large as the Q-factor when the substrate is entirely absent). This causes the amplitude of the output signal from the sensor circuit to plateau.

In addition to sensing changes in amplitude, the eddy current monitoring system can calculate a phase shift in the sensed signal. As the metal layer is polished, the phase of the sensed signal changes relative to the drive signal from oscillator 50. This phase difference can be correlated to the thickness of the polished layer.

One implementation of a phase measuring device, shown in FIG. 8, combines the drive and sense signals to generate both an amplitude signal and a phase shift signal with a pulse width or duty cycle which is proportional to the phase difference. In this implementation, two XOR gates 100 and 102 are used to convert sinusoidal signals from sense coil 46 and oscillator 50, respectively, into square-wave signals. The two square-wave signals are fed into the inputs of a third XOR gate 104. The output of the third XOR gate 104 is a phase shift signal with a pulse width or duty cycle proportional to the phase difference between the two square wave signals. The phase shift signal is filtered by an RC filter 106 to generate a DC-like signal with a voltage proportional to the phase difference. Alternatively, the signals can be fed into a programmable digital logic, e.g., a Complex Programmable Logic Device (CPLD) or Field Programmable Gate Array (FGPA) that performs the phase shift measurements. An example of a trace generated by the eddy current monitoring system that measures the phase difference between the drive and sense signals is shown in FIG. 9. Since the phase measurements are highly sensitive to the stability of the driving frequency, phase locked loop electronics may be added.

A possible advantage of the phase difference measurement is that the dependence of the phase difference on the metal layer thickness may be more linear than that of the amplitude. In addition, the absolute thickness of the metal layer may be determined over a wide range of possible thicknesses.

Returning to FIG. 3A, optical monitoring system 140, which can function as a reflectometer or interferometer, can be secured to platen 24 in recess 26 with eddy current monitoring system 40. The optical monitoring system 140 includes a light source 144 and a detector 146. The electronics for light source 144 and detector 146 may be located on printed circuit board 160. The light source generates a light beam 142 which propagates through transparent window section 36 and slurry to impinge upon the exposed surface of the substrate 10. For example, light source 144 may be a laser and light beam 142 may be a collimated laser beam. Light laser beam 142 can be projected from laser 144 at an angle from an axis normal to the surface of substrate 10. In addition, if hole 26 and window 36 are elongated, a beam expander (not illustrated) may be positioned in the path of the light beam to expand the light beam along the elongated axis of the window. In general, the optical monitoring system functions as described in U.S. patent application Ser. Nos. 09/184,775, filed Nov. 2, 1998, and 09/184,767, filed Nov. 2, 1998, the entire disclosures of which are incorporated herein by references.

Referring to FIGS. 10A-10C, optical monitoring system 140 can be positioned so that light beam 142 impinges the substrate at a position between two prongs 43 of core 42. In one implementation, light source 144 is positioned to direct light beam 142 toward core 42 along a path substantially parallel to the surface of platen 24. The light beam 142 is reflected upwardly from a mirror 162 positioned just before core 42 so that light beam 142 passes between prongs 43, is reflected from substrate 10, and then impinges a detector 146 that has at least a portion positioned between prongs 43. In this configuration, the light beam is directed to a spot on the substrate inside a region covered by the magnetic field from the core. Consequently, the optical monitoring system 140 can measure the reflectivity of substantially the same location on the substrate as is being monitored by the eddy current monitoring system 40. Although not illustrated, core 42 and detector 146 can be mounted on or attached to one or more printed circuit boards 160.

An example of a trace 250 generated by an optical monitoring system is shown in FIG. 11. The overall shape of intensity trace 250 may be explained as follows. Initially, metal layer 16 has some initial topography because of the topology of the underlying patterned layer 14. Due to this topography, the light beam scatters when it impinges the metal layer. As the polishing operation progresses in section 252 of the trace, the metal layer becomes more planar and the reflectivity of the polished metal layer increases. As the bulk of the metal layer is removed in section 254 of the trace, the intensity remains relatively stable. Once the oxide layer begins to be exposed in the trace, the overall signal strength drops quickly in section 256 of the trace. Once the oxide layer is entire exposed in the trace, the intensity stabilizes again in section 258 of the trace, although it may undergo small oscillations due to interferometric effects as the oxide layer is removed.

Returning to FIGS. 3A, 3B and 4, the CMP apparatus 20 can also include a position sensor 80, such as an optical interrupter, to sense when core 42 and light source 44 are beneath substrate 10. For example, the optical interrupter could be mounted at a fixed point opposite carrier head 70. A flag 82 is attached to the periphery of the platen. The point of attachment and length of flag 82 is selected so that it interrupts the optical signal of sensor 80 while transparent section 36 sweeps beneath substrate 10. Alternately, the CMP apparatus can include an encoder to determine the angular position of platen.

A general purpose programmable digital computer 90 receives the intensity signals and phase shift signals from the eddy current sensing system, and the intensity signals from the optical monitoring system. The printed circuit board 160 can include circuitry, such as a general purpose microprocessor or an application-specific integrated circuit, to convert the signals from the eddy current sensing system and optical monitoring system into digital data. This digital data can be assembled into discrete packets which are sent to computer 90 via a serial communication channel, e.g., RS-232. So long as both printed circuit board 160 and computer 90 use the same packet format, computer 90 can extract and use the intensity and phase shift measurements in the endpoint or process control algorithm. For example, each packet can include five bytes, of which two bytes are optical signal data, two bytes are either amplitude or phase difference data for the eddy current signal, one bit indicates whether the packet includes amplitude or phase shift data, and the remaining bits include flags for whether window section 36 is beneath the substrate, check-sum bits, and the like.

Since the monitoring systems sweep beneath the substrate with each rotation of the platen, information on the metal layer thickness and exposure of the underlying layer is accumulated in-situ and on a continuous real-time basis (once per platen rotation). The computer 90 can be programmed to sample measurements from the monitoring system when the substrate generally overlies transparent section 36 (as determined by the position sensor). As polishing progresses, the reflectivity or thickness of the metal layer changes, and the sampled signals vary with time. The time varying sampled signals may be referred to as traces. The measurements from the monitoring systems can be displayed on an output device 94 during polishing to permit the operator of the device to visually monitor the progress of the polishing operation. In addition, as discussed below, the traces may be used to control the polishing process and determine the end-point of the metal layer polishing operation.

In operation, CMP apparatus 20 uses eddy current monitoring system 40 and optical monitoring system 140 to determine when the bulk of the filler layer has been removed and to determine when the underlying stop layer has been substantially exposed. The computer 90 applies process control and endpoint detection logic to the sampled signals to determine when to change process parameter and to detect the polishing endpoint. Possible process control and endpoint criteria for the detector logic include local minima or maxima, changes in slope, threshold values in amplitude or slope, or combinations thereof.

In addition, computer 90 can be programmed to divide the measurements from eddy current monitoring system 40 and optical monitoring system 140 from each sweep beneath the substrate into a plurality of sampling zones 96, to calculate the radial position of each sampling zone, to sort the amplitude measurements into radial ranges, to determine minimum, maximum and average measurements for each sampling zone, and to use multiple radial ranges to determine the polishing endpoint, as discussed in U.S. patent application Ser. No. 09/460,529, filed Dec. 13, 1999, the entirety of which is incorporated herein by reference.

Furthermore, computer 90 can be programmed to determine the thickness of polishing pad 30 and the absolute thickness of conductive layer 16 based on the signals from eddy current monitoring system 40. In general, both the intensity and phase shift signals from the eddy current detector depends on the distance between core 40 and conductive layer 16. In particular, as shown in FIGS. 12A and 12B, as the polishing pad wears and becomes thinner, conductive layer 16 will move closer to core 40, the coupling will increase, and consequently the strength of the amplitude and phase signals will decrease.

As previously noted, both the intensity and phase shift signals from eddy current monitoring system 40 also depend on the thickness of conductive layer 16. However, above a certain critical thickness of the conductive layer, the amplitude signal tends to be insensitive to the layer thickness. Thus, when polishing begins, the amplitude signal remains constant until sufficient material has been removed (at time δ) that the conductive layer is thinner than the critical thickness. At this point, the amplitude signal begins to increase in strength. In contrast, the phase shift signal reacts immediately to changes in the thickness of the conductive layer.

The intensity and phase shift signals can be used to determine the thickness of the polishing pad. Initially, a calibration step is performed to polish a test substrate with a conductive layer thicker than the critical thickness on two polishing pads of known, different thicknesses. Alternatively, the calibration step could be performed using the same pad at different stages of wear. During the calibration step, the strengths of the intensity signal and phase shift signal are measured for each polishing pad. From these measurements, two coefficients $\Delta_A$ and $\Delta_{101}$ are calculated, representing the change in signal strength of the amplitude and phase shift signals, respectively, due to the pad thickness.

Thereafter, during polishing of a device wafer, the measured strengths of the intensity and phase shift signals and the coefficients $\Delta_A$ and $\Delta_{101}$ (or an equivalent lookup table) can be used to determine the thickness of the polishing pad. In particular, since the amplitude signal is insensitive to the thickness of the conductive layer at the beginning of the polishing process, this initial strength of the amplitude signal correlates to the thickness of the polishing pad. The measured thickness of the polishing pad may then be used to modify the polishing parameters or generate an alert. For example, if the polishing pad thickness drops below a predetermined value, the computer can generate a signal to indicate that the polishing pad needs to be replaced.

The intensity and phase shift signals can also be used to determine the absolute thickness of the conductive layer on the substrate during polishing. Since the phase shift signal is immediately sensitive to changes in the thickness of the conductive layer, a look-up table can be generated (based on experimental measurements of a test substrate) to relate the strength of the phase shift signal to the thickness of the conductive layer. During polishing of a device substrate, the initial strength of the amplitude signal can be measured at the beginning of polishing. Using the two coefficients $\Delta_A$ and $\Delta_{101}$, the computer can calculate an adjusted phase signal strength that accounts for any offset due to changes in the polishing pad thickness. The computer can then use the lookup table and the adjusted phase signal strength to accurately calculate the absolute thickness of the conductive layer.

Computer 90 may also be connected to the pressure mechanisms that control the pressure applied by carrier head 70, to carrier head rotation motor 76 to control the carrier head rotation rate, to the platen rotation motor (not shown) to control the platen rotation rate, or to slurry distribution system 39 to control the slurry composition supplied to the polishing pad. Specifically, after sorting the measurements into radial ranges, information on the metal film thickness can be fed in real-time into a closed-loop controller to periodically or continuously modify the polishing pressure profile applied by a carrier head, as discussed in U.S. patent application Ser. No. 09/609,426, filed Jul. 5,2000, the entirety of which is incorporated herein by reference. For example, the computer could determine that the endpoint criteria have been satisfied for the outer radial ranges but not for the inner radial ranges. This would indicate that the underlying layer has been exposed in an annular outer area but not in an inner area of the substrate. In this case, the computer could reduce the diameter of the area in which pressure is applied so that pressure is applied only to the inner area of the substrate, thereby reducing dishing and erosion on the outer area of the substrate.

The eddy current and optical monitoring systems can be used in a variety of polishing systems. Either the polishing pad, or the carrier head, or both can move to provide relative motion between the polishing surface and the substrate. The polishing pad can be a circular (or some other shape) pad secured to the platen, a tape extending between supply and take-up rollers, or a continuous belt. The polishing pad can be affixed on a platen, incrementally advanced over a platen between polishing operations, or driven continuously over the platen during polishing. The pad can be secured to the platen during polishing, or there could be a fluid bearing between the platen and polishing pad during polishing. The polishing pad can be a standard (e.g., polyurethane with or without fillers) rough pad, a soft pad, or a fixed-abrasive pad. Rather than tuning when the substrate is absent, the drive frequency of the oscillator can be tuned to a resonant frequency with a polished or unpolished substrate present (with or without the carrier head), or to some other reference.

Although illustrated as positioned in the same hole, optical monitoring system 140 could be positioned at a different location on the platen than eddy current monitoring system 40. For example, optical monitoring system 140 and eddy current monitoring system 40 could be positioned on opposite sides of the platen, so that they alternately scan the substrate surface.

Various aspects of the invention, such as placement of the coil on a side of the polishing surface opposite the substrate or the measurement of a phase difference, still apply if the eddy current sensor uses a single coil. In a single coil system, both the oscillator and the sense capacitor (and other sensor circuitry) are connected to the same coil.

The present invention has been described in terms of a preferred embodiment. The invention, however, is not limited to the embodiment depicted and described. Rather, the scope of the invention is defined by the appended claims.

What is claimed is:

1. A method of measuring conductive layer thickness during chemical mechanical polishing, the method comprising:
    positioning a substrate having a conductive layer disposed thereon in contact with a polishing surface of a polishing pad;
    creating relative motion between the substrate and the polishing pad to polish the substrate;
    driving an inductor with a drive signal to generate an alternating magnetic field that induces eddy currents in the conductive layer during polishing;
    measuring a strength of the magnetic field and a phase difference between the magnetic field and the drive signal during polishing;
    calculating a correction factor based on the strength of the magnetic field;
    calculating a thickness of the conductive layer from the phase difference and the correction factor; and
    polishing a test substrate with a first polishing pad having a first known thickness and with a second polishing pad having a second known thickness, and generating at least one coefficient to relate pad thickness to magnetic field strength during polishing; and
    calculating the thickness of the polishing pad contacting the substrate from at least the strength of the magnetic field and the coefficient.

2. A method of measuring conductive layer thickness during chemical mechanical polishing, the method comprising:
    positioning a substrate having a conductive layer disposed thereon in contact with a polishing surface of a polishing pad;
    creating relative motion between the substrate and the polishing pad to polish the Substrate;
    driving an inductor with a drive signal to generate an alternating magnetic field that induces eddy currents in the conductive layer during polishing;
    measuring a strength of the magnetic field and a phase difference between the magnetic field and the drive signal during polishing;
    calculating a correction factor based on the strength of the magnetic field;
    calculating a thickness of the conductive layer from the phase difference and the correction factor;
    polishing a test substrate with a first polishing pad when the first polishing pad has a first known thickness, polishing the test substrate with the first polishing pad when the first polishing pad has a second known thickness, and generating at least one coefficient to relate pad thickness to magnetic field strength during polishing; and
    calculating the thickness of the polishing pad contacting the substrate from at least the strength of the magnetic field and the coefficient.

3. The method of claim 2, further comprising alerting a user if the thickness of the polishing pad contacting the substrate falls below a predetermined thickness.

4. A computer-program product, tangibly stored on machine readable medium, the product comprising instructions operable to cause a polisher to perform a method comprising:

positioning a substrate having a conductive layer disposed thereon in contact with a polishing surface of a polishing pad;

creating relative motion between the substrate and the polishing pad to polish the substrate;

driving an inductor with a drive signal to generate an alternating magnetic field that induces eddy currents in the conductive layer;

measuring a strength of the magnetic field and a phase difference between the magnetic field and the drive signal;

calculating a correction factor based on the strength of the magnetic field; and calculating a thickness of the conductive layer from the phase difference and the correction factor;

polishing a test substrate with a first polishing pad having a first known thickness and with a second polishing pad having a second known thickness, and generating at least one coefficient to relate pad thickness to magnetic field strength during polishing; and calculating the thickness of the polishing pad contacting the substrate from at least the strength of the magnetic field and the coefficient.

5. A computer-program product, tangibly stored on machine readable medium, the product comprising instructions operable to cause a polisher to perform a method comprising:

positioning a substrate having a conductive layer disposed thereon in contact with a polishing surface of a polishing pad;

creating relative motion between the substrate and the polishing pad to polish the substrate;

driving an inductor with a drive signal to generate an alternating magnetic field that induces eddy currents in the conductive layer;

measuring a strength of the magnetic field and a phase difference between the magnetic field and the drive signal;

calculating a correction factor based on the strength of the magnetic field; and calculating a thickness of the conductive layer contacting the substrate from the phase difference and the correction factor;

polishing a test substrate with a first polishing pad when the first polishing pad has a first known thickness, polishing the test substrate with the first polishing pad when the first polishing pad has a second known thickness, and generating at least one coefficient to relate pad thickness to magnetic field during polishing; and calculating the thickness of the polishing pad contacting the substrate from at least the strength of the magnetic field and the coefficient.

6. The product of claim 5, wherein the method further comprises providing an alert if the thickness of the polishing pad contacting the substrate falls below a predetermined thickness.

* * * * *